United States Patent [19]

Gilger, II

[11] 4,220,436
[45] Sep. 2, 1980

[54] HAY GATHERING APPARATUS

[76] Inventor: Douglas D. Gilger, II, Boyes, Mont. 59316

[21] Appl. No.: 836,029

[22] Filed: Sep. 23, 1977

[51] Int. Cl.² .................................................. B60P 1/00
[52] U.S. Cl. ................................. 414/434; 56/328 R; 56/377
[58] Field of Search .................... 214/353, 356, 350; 56/328 R, 346, 348, 377; 414/434, 437, 440

[56] References Cited

U.S. PATENT DOCUMENTS

| | | | |
|---|---|---|---|
| 386,593 | 7/1888 | Kramer | 214/353 |
| 2,649,982 | 8/1953 | Ray | 214/353 |
| 2,674,840 | 4/1954 | Renelt | 214/353 |
| 2,845,769 | 8/1958 | Hintz et al. | 56/344 |
| 3,125,845 | 3/1964 | Lee | 56/377 |
| 3,499,550 | 3/1970 | Jensen | 214/353 |

FOREIGN PATENT DOCUMENTS 823026  9/1969  Canada ........................................ 214/353

Primary Examiner—Lawrence J. Oresky
Attorney, Agent, or Firm—Arthur L. Urban

[57] ABSTRACT

Hay gathering apparatus including a supporting framework capable of being attached to a towing vehicle, a plurality of spaced, substantially parallel carrier elements disposed longitudinally of the framework in contact with the ground along substantially their entire lengths, each carrier element being flexibly connected only at its forward end to the framework at a point adjacent the attachment of the framework to the towing vehicle, opposing side delivery rakes suspended from the framework adjacent the forward ends of the carrier elements for the transfer of hay from windrows on either side of the framework onto the carrier elements, a movable end gate suspended from the framework adjacent the rearward ends of the carrier elements, and means for raising the end gate away from the carrier elements.

10 Claims, 4 Drawing Figures

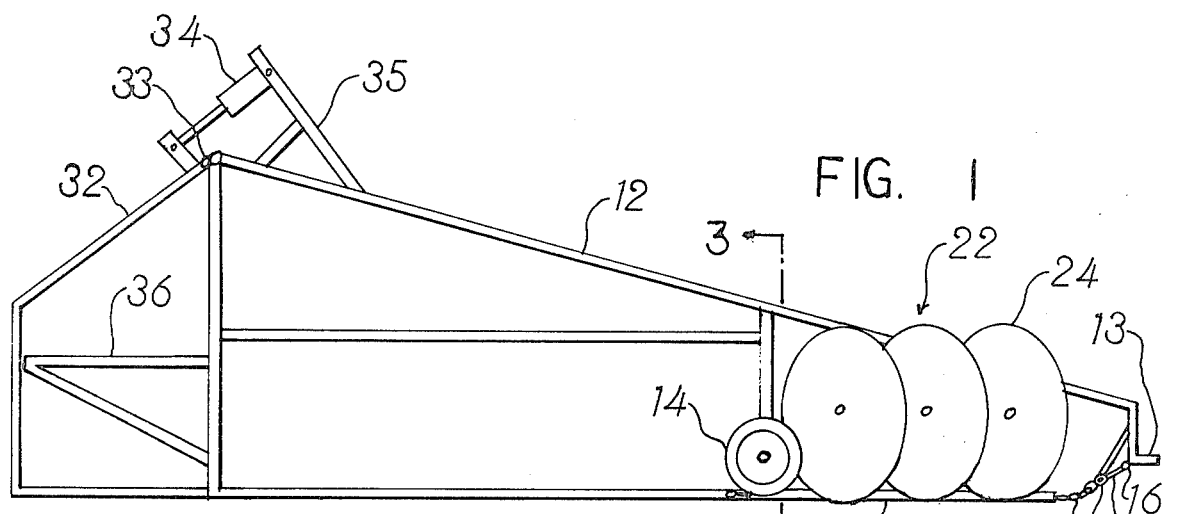
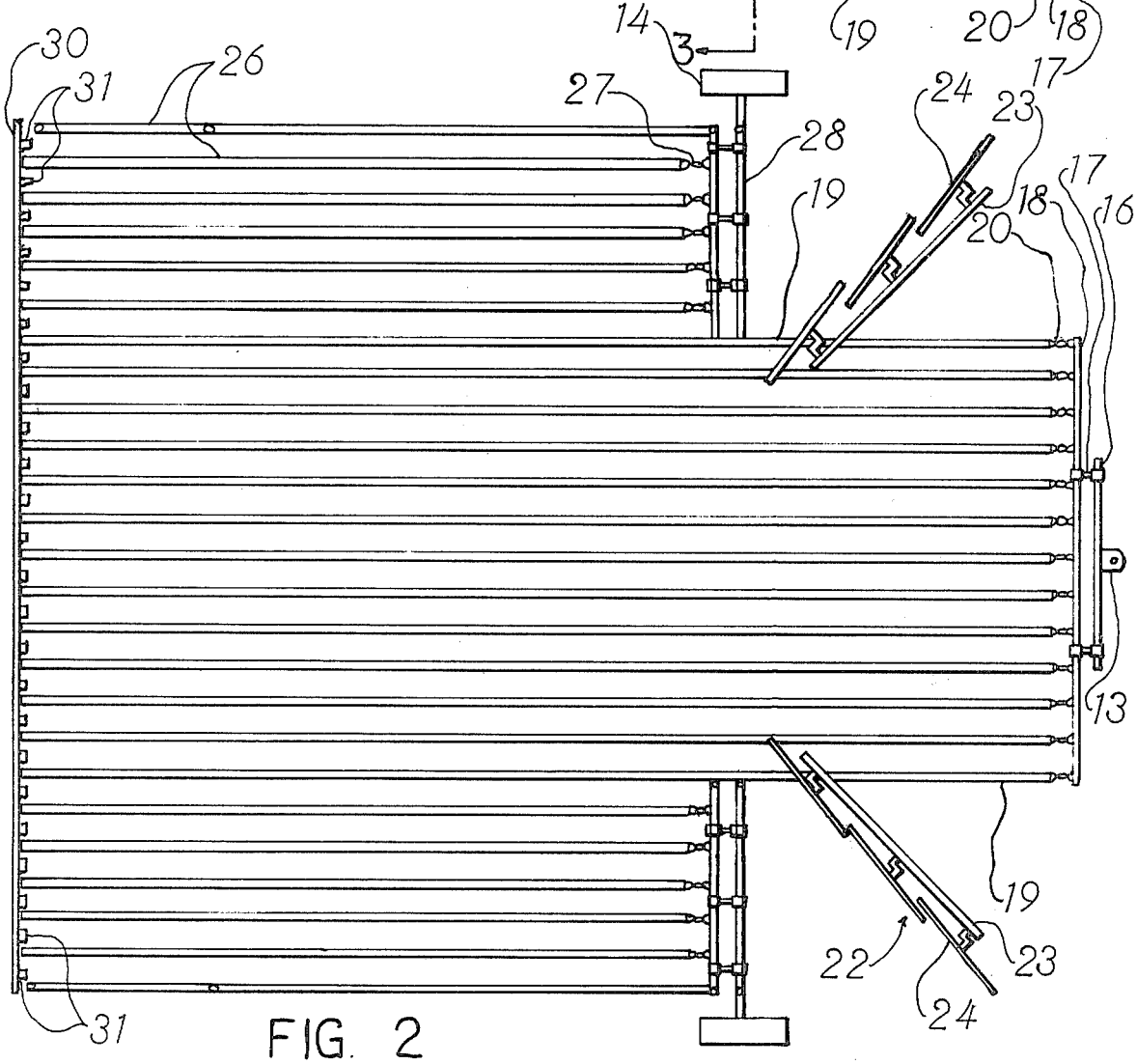

HAY GATHERING APPARATUS

This invention relates to a novel apparatus for gathering hay and more particularly relates to an apparatus for gathering cut hay into bunches in a single pass.

In the harvesting of hay, a field ordinarily is cut with a mower or swather which drops the hay in long windrows behind the cutting machinery. The windrows then are combined into larger windrows by going over the field with a rake a number of times. The windrows are gathered into bunches in another pass over the field. Finally, the bunches are collected and stacked.

The multiple passes over a field required with conventional haying operations cause problems. Since the nutrient value of hay is dependent upon the amount of leaf on the hay, the more times the hay is handled, the greater the leaf loss. Also, the extra time required for the multiple passes increases the chance of crop loss due to rain. In addition, the extra passes necessitate extra expenditures for labor. Furthermore, increased fuel costs for equipment and a greater investment in machinery result with multiple pass haying operations. Thus, reducing the number of passes in haying operations, is a very desirable goal.

The present invention provides a novel apparatus for gathering hay with fewer passes over a field than required with present machinery. The apparatus of the invention gathers the hay with a minimum of handling so a high percentage of the leaf is retained. Thus, hay gathered with the apparatus of the invention has a higher nutrient value than hay collected with multiple pass operations. Furthermore, the apparatus results in savings in labor and equipment investment and operating costs. Also, with the novel hay gathering apparatus, the chance of crop loss because of rain is reduced since the hay can be gathered and stacked more quickly if there is a threat of rain. Moreover, the apparatus of the invention is simple in design and can be fabricated from available components.

Other benefits and advantages of the novel hay gathering apparatus of the present invention will be apparent from the following description and the accompanying drawings in which:

FIG. 1 is a side elevation of one form of the novel hay gathering apparatus of the present invention;

FIG. 2 is a top view showing the arrangement of the rakes and carrier elements of the hay gathering apparatus of FIG. 1;

Figure 3:
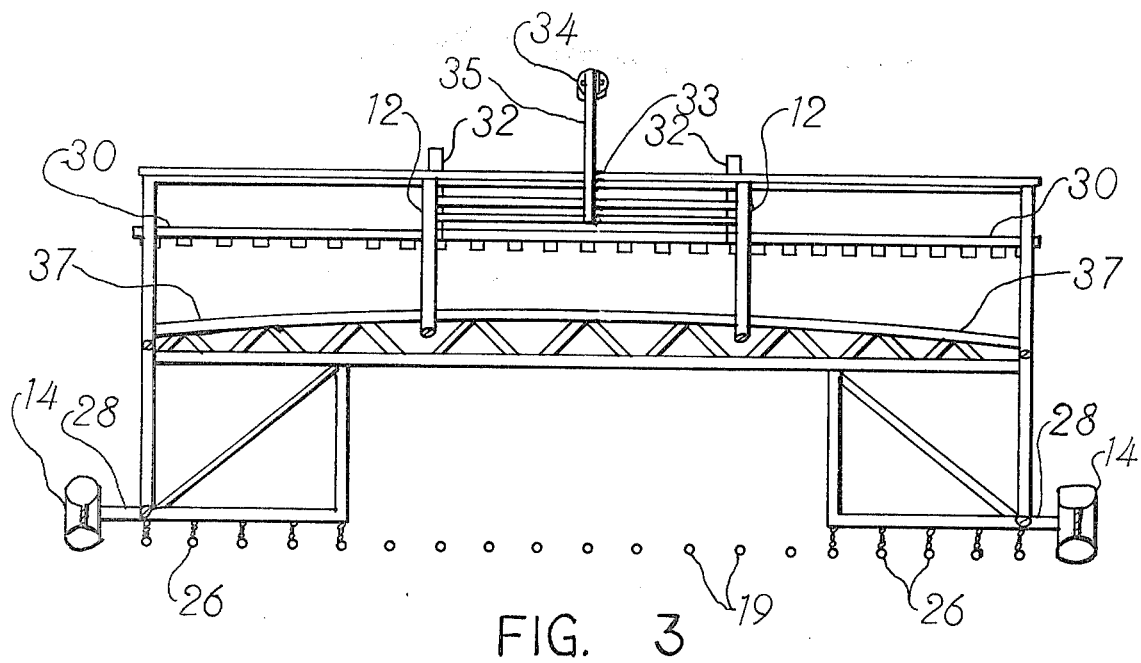
FIG. 3 is a sectional view taken along line 3—3 of FIG. 1.
Figure 4:
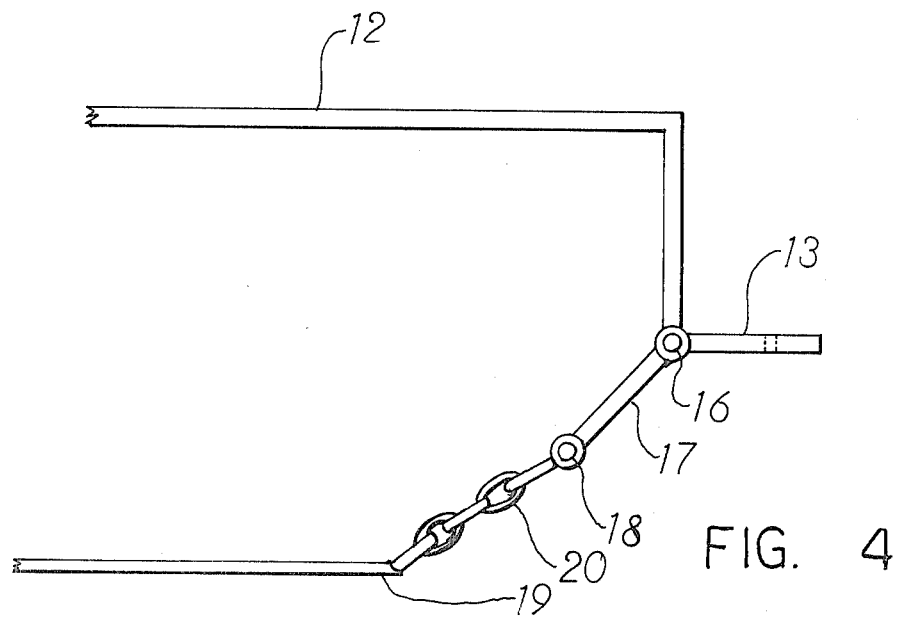
FIG. 4 is an enlarged fragmentary side view showing the attachment of the forward ends of the carrier elements to the framework.

As shown in the drawings, one form of the novel hay gathering apparatus of the present invention includes a supporting framework 12 with a hitch portion 13 which can be attached to a towing vehicle (not shown). Framework 12 is suspended above the ground by wheels 14 on either side of the framework. Framework 12 also includes a cross member 16 located adjacent the hitch portion 13. Extending rearwardly from cross member 16 are struts 17 which are pivotally connected to the cross member and also to a lower transverse support 18.

Longitudinal carrier elements 19 are attached to support 18 by chains 20 or other suitable flexible connectors such as cables which are secured to the forward ends of the carrier elements. Chains 20 are of sufficient length that the carrier elements 19 are in contact with the ground along substantially their entire lengths. The carrier elements 19 are connected to the framework 12 only through the chains 20 with no other connection along their lengths.

The carrier elements 19 advantageously are spaced apart between about two and twelve inches and preferably between about four and eight inches. The size of the carrier elements will depend to a large extent upon their cross-sectional shape and the rigidity of the material from which they are fabricated. Advantageously, the carrier elements are hollow metal pipes having a diameter between about one-half and one inch. With other configurations, such as flat bars, the width may be up to two inches or more. The carrier elements 19 may be of any desired length, although lengths between about ten and twenty feet are particularly useful.

Side delivery rakes 22 are suspended from framework 12 on supports 23. The rakes 22 are positioned adjacent the forward ends of carrier elements 19 on each side of the carrier elements. This arrangement of the rakes enables hay laying in the field to be transferred onto the bed formed by the carrier elements. Various types of side delivery rakes may be utilized, although wheel rakes as shown in the drawings having a plurality of overlapping wheels 24 are preferred.

Shorter carrier elements 26 are suspended from axles 28 of wheels 14 with chains 27 using an arrangement similar to that for carrier elements 19. These carrier elements 26 provide greater width to the bed of carrier elements behind the rakes 22. Advantageously, the total width or transverse distance across the bed of carrier elements 19 and 26 is between about ten and fifteen feet.

Adjacent the free ends of carrier elements 19 and 26 is an end gate 30 which preferably has a plurality of spaced projections or teeth 31 along its length. Gate 30 is attached to brackets 32 extending from rotatable shaft 33. Shaft 33 is rotated by a piston and cylinder 34 mounted on framework 12 with supports 35.

Side barriers 36 extend rearwardly from framework 12 toward end gate 30 at a point above the ground. Framework 12 also may include one or more transverse truss members 37 to increase rigidity.

In the operation of the hay gathering apparatus shown in the drawings, the hitch portion 13 is attached to a tractor or other vehicle and towed over a field in which the hay has been cut and dropped in long windrows. The wheel rakes 22 are adjusted so they will reach the windrows on each side of the apparatus when the machine is passed between the windrows.

As the apparatus moves forward, the hay in each windrow is transferred by the outside wheel of wheels 24 successively to each of the inner wheels until the hay is delivered onto the bed of carrier elements 19. Continuing the forward movement of the apparatus, drags the carrier elements along the ground causing the hay to move backward by its contact with the ground between the carrier elements. The hay piles up against the end gate 30 and the side barriers 36.

When the space within the framework 12 is filled with hay, the piston and cylinder 34 are activated by the operator of the tow vehicle, for example, by actuating controls (not shown) to direct hydraulic fluid into one side of the cylinder. This causes end gate 30 to be raised which allows the hay within framework 12 to slide off the ends of carrier elements 19 and 26 while the apparatus is moving and form a pile on the ground. The piles or bunches then can be picked off the ground and stacked or stored in other known ways.

The above description and the accompanying drawings show that the present invention provides a novel apparatus for collecting hay from a field with fewer passes than required with existing machinery. Hay gathered with the apparatus of the invention has a high nutrient value since it contains a higher percentage of leaf. This is because the handling is significantly reduced with the apparatus of the invention as compared with present multiple pass operations. In addition, employing the apparatus reduces labor and machinery costs. Further, crop loss due to rain is reduced because cut hay can be removed from a field more quickly in the event of a threat of rain. Also, the apparatus can be fabricated from available materials and components.

It will be apparent that various modifications can be made in the specific hay gathering apparatus described in detail above and shown in the drawings within the scope of the invention. For example, the framework may be of a different configuration. Also, the wheels 14 may be replaced with skids if desired. Therefore, the invention is to be limited only by the following claims.

What is claimed is:

1. Hay gathering apparatus including a supporting framework capable of being attached to a towing vehicle, a plurality of spaced substantially parallel carrier elements disposed longitudinally of said framework in contact with the ground along substantially their entire lengths, each carrier element being flexibly connected only at its forward end to said framework at a point adjacent the attachment of said framework to said towing vehicle, opposing side delivery rakes suspended from said framework adjacent the forward ends of said carrier elements for the transfer of hay from windrows on either side of said framework onto said carrier elements, a moveable end gate suspended from said framework adjacent the rearward ends of said carrier elements, and means for raising the end gate away from said carrier elements, said carrier elements having a center section of elements of a given length and said side sections on each side of said center section having elements which are of a length shorter than those of said center section, and said rakes are mounted on each side of said center section and in front of the respective side sections.

2. Hay gathering apparatus according to claim 1 wherein said framework is suspended above the ground on rotatable wheels.

3. Hay gathering apparatus according to claim 1 wherein said rakes are wheel rakes with a plurality of overlapping wheels in each rake.

4. Hay gathering apparatus according to claim 1 wherein said carrier elements extend a substantial distance beyond the rear of said framework.

5. Hay gathering apparatus according to claim 1 wherein said end gate has a plurality of projections extending along its length.

6. Hay gathering apparatus according to claim 1 wherein said means for raising said end gate includes a piston and cylinder.

7. Hay gathering apparatus according to claim 1 wherein the forward ends of said carrier elements are connected to said framework with chains.

8. Hay gathering apparatus according to claim 1 wherein said carrier elements are hollow metal pipes.

9. Hay gathering apparatus according to claim 1 wherein the spacing between said carrier elements is between about two and twelve inches.

10. Hay gathering apparatus according to claim 1 wherein the spacing between said carrier elements is between about four and eight inches.

* * * * *